United States Patent

Dickens et al.

[15] 3,654,400

[45] Apr. 4, 1972

[54] WEB HANDLING APPARATUS

[72] Inventors: Bernard L. Dickens, Cherry Hill; Leonard J. Kudla, Haddon Heights; Arch C. Luther, Jr.; Bruno F. Melchionni, both of Cherry Hill, all of N.J.

[73] Assignee: RCA Corporation, New York, N.Y.

[22] Filed: Mar. 17, 1969

[21] Appl. No.: 807,839

[52] U.S. Cl. ................179/100.2 T, 179/100.2 Z, 242/200, 242/209, 242/210, 274/4 E

[51] Int. Cl...................................G11b 15/66, G11b 23/10

[58] Field of Search ........................242/197–200, 201–204, 242/206–210, 71.1–71.2, 190, 192, 195; 179/100.2 T, 100.2 Z; 274/4, 11

[56] References Cited

UNITED STATES PATENTS

| | | | |
|---|---|---|---|
| 3,146,316 | 8/1964 | Knoth | 242/198 UX |
| 3,395,871 | 8/1968 | Ackermann et al. | 242/198 |
| 2,904,275 | 9/1959 | Selsted et al. | 242/190 |
| 3,025,011 | 3/1962 | Camras | 242/195 X |

OTHER PUBLICATIONS

Johnson et al., Automatic Tape Threading I.B.M. Technical Disclosure Bulletin Vol. 9, No. 8, Jan., 1967

*Primary Examiner*—George F. Mautz
*Attorney*—Edward J. Norton

[57] ABSTRACT

Apparatus for automatically disposing a record web for operation by the transport of a recorder-reproducer system. The web is first formed into a given shape which approximates the shape of the operating path defined by the transport elements. The web is then interlaced with the elements of the transport. To retract the web, the reverse sequence is utilized.

9 Claims, 3 Drawing Figures

INVENTORS
Bernard L. Dickens,
Leonard J. Kudla,
Arch C. Luther, Jr., and
Bruno F. Melchionni BY Edward J Norton
ATTORNEY INVENTORS
Bernard L. Dickens,
Leonard J. Kudla,
Arch C. Luther, Jr., and
Bruno F. Melchionni BY Edward J Norton
ATTORNEY

WEB HANDLING APPARATUS

This invention relates to web handling apparatus, and more particularly to an apparatus for automatically disposing a record medium along and removing the medium from the normal operating path of the transport assembly of a recorder-reproducer system.

Recorder-reproducer systems have found widespread use as a source of video material, particularly in television broadcast operations. In many such applications, it is required to sequentially utilize video information from a number of separate magnetic recordings. This may be accomplished by employing several magnetic recorder-reproducer systems, each having a magnetic record medium with a desired portion of video information. Since recorder-reproducer systems are generally elaborate and costly, it is not always practical to require the utilization of several of these systems. This is especially true where each system provides only short duration segments for the video sequence.

Alternatively, one or a pair of recorder-reproducer systems are employed. An operator then manually loads and unloads each system a number of times, with the various record mediums containing a segment of the desired video information. This technique is time consuming and hence not most desirable. Further, the frequent handling of the record medium by the operator, makes it susceptible to damage. This may degrade the stored information, or interfere with its recovery by the recorder-reproducer system. The solution of these problems appears to be the provision of a means for automatically loading and unloading a record medium for operation by the transport of a recorder- reproducer system.

An approach utilized in equipment such as film projectors, is to automatically thread the end of the film past each element defining the operating path for the film. However the magnetic record medium used in most recorder-reproducer systems is usually made of an extremely flexible material. Therefore, such record mediums are not readily adaptable to end threading techniques such as used for the more rigid film.

It is therefore an object of the present invention to provide an improved apparatus for automatically disposing a web-like medium along and removing the medium from, the operating path of the transport assembly of a web handling system.

In accordance with an embodiment of the invention, there is provided a web transport for guiding a flexible record medium. The transport means are disposed on one side of a given plane. The projection of the transport means on the given plane defines a first path. Means are provided for forming the medium into a predetermined shape on the other side of the given plane. The projection of the shaped medium on the given plane defines a second path which approximates the shape of the first path. Means are provided for moving at least one of the record medium and the transport means toward the other, to place the medium in operative relation with the transport means.

Turning now to the drawings in conjunction with which a more detailed description of one embodiment of the invention will be given;

FIG. 2 also shows in phantom, additional positioning of the elements in the sequence.

Figures 1, 2:
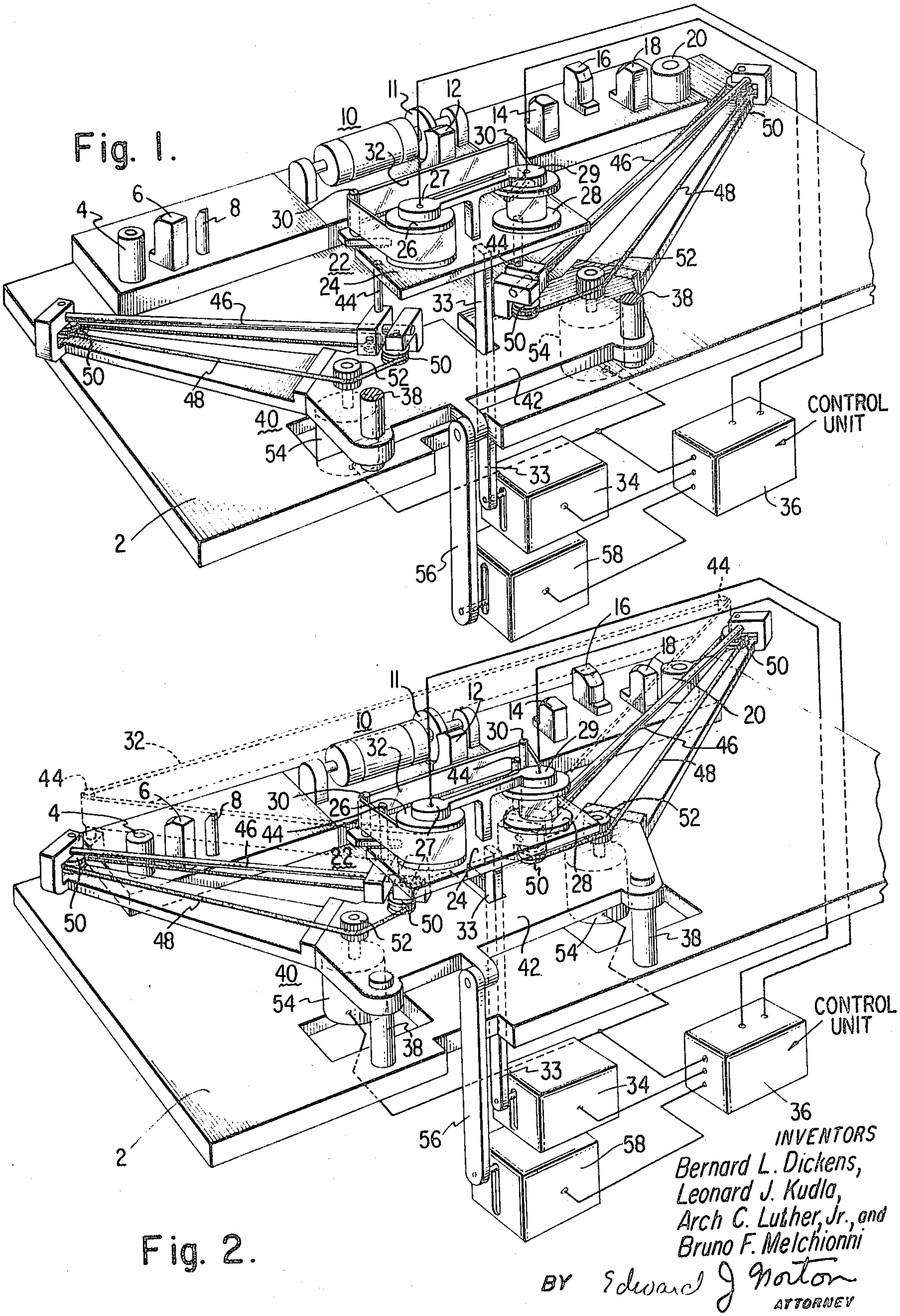
FIG. 1 is a perspective view of a record web handling apparatus embodying the invention, wherein elements thereof are shown in a first position of an operating sequence.
FIG. 2 is a perspective view of the embodiment of FIG. 1, wherein elements thereof are shown in a second position of the operating sequence.

If reference is made to FIG. 1, there is shown a base member 2, upon which are mounted a series of web transport means. The transport means include a guide roller 4, a first stationary transducer 6, and a guide post 8. In addition, the transport has a rotating transducer assembly 10, including a rotatable headwheel 11 with a complementary shaped shoe or guide member 12 in juxtaposed relation to the headwheel 11.

Further included in the transport are second and third stationary transducers 14 and 16, a second guide post 18, and a rotatable capstan 20. The displacement of the transport elements from one another define an operating path for a recording web.

A frame member 24 is mounted for slidable movement up and down with respect to the base member 2. Mounted on the frame member 24 is a web storage assembly 22 having a pair of rotatably mounted reels 26 and 28 and a pair of guide members 30. A record medium web 32 is wound between the reels 26, 28, and extends about the guide members 30.

Mounted on the frame 24 and coupled to the reel 26 is a drag or torquing member 27 which is energized from a control unit 36 which is coupled to the member 27. The member 27 when energized, imparts a force or drag on the reel 26, which opposes pay out of the record medium 32 from the reel 26. A second drag or torquing member may be coupled to the reel 28 to oppose pay of the medium 32 from reel 28. However in the present embodiment, preferably the reel 28 is coupled to a brake member 29 mounted on the frame 24, which is energized from the control unit 36. The brake 29 when energized prevents rotation of the reel 28 and hence prevents movement of the medium 32 from the reel 28. This arrangement tensions the medium 32 and enables withdrawing the medium 32 from only the reel 26. This permits ultimate positioning of a given portion of the medium 32 at a desired point along the operating path for the medium 32.

A connecting rod 33 is coupled at one end to the frame 24. The other end of connecting rod 33 is coupled to a prime mover 34. When energized from the control unit 36, the prime mover 34 positions the assembly 22 with respect to base member 2.

A pair of fixed columns 38 are affixed to the base member 2. A web engaging assembly 40 is mounted on the column 38 for slidable movement up and down with respect to the base member 2. The assembly 40 comprises a frame member 42, having a pair of pin members 44 adapted to engage the record medium 32. Each of the pin members 44 are slidably mounted on a bar 46 affixed to the frame 42. One end of the bars 46 is adjacent to the location of the web storage assembly 22. The bars 46 extend angularly outward to a point adjacent the respective ends of the path between the transport elements. The pin members 44 are moved along the bars 46 by belts 48 which are coupled to pins 44. The belts 48, which extend about fixed pulleys 50, are moved by driven elements 52 which are rotated by prime movers 54. The prime movers 54 are coupled to the control unit 36, which controls the movement of the pins 44 along the bars 46.

A connecting rod 56 is coupled at one end to the frame 42. The other end of connecting rod 56 is coupled to a prime mover 58. When energized from the control unit 36, the prime mover 58 positions the assembly 40 with respect to the base member 2.

In the operation of the invention, the control unit 36 which energizes the prime mover devices 34, 54, 58 in a controlled sequence, causes the assembly to be initially oriented as shown in FIG. 1. The web storage assembly 22 is elevated above the base member 2. The web engaging assembly is in its lower position, with the pins 44 positioned at the end of the bar 46 which is adjacent to the web storage assembly 22.

If reference is now made to FIG. 2, in which like reference numerals correspond to the elements shown and described in FIG. 1, there is shown further steps in the operating sequence. In FIG. 2, the assembly 40 is disposed in its raised position by the prime mover 58. In this position the pins 44 are interposed between the reels 26, 28 and the medium 32 passing about the guide members 30. The pins 44 are then moved outward along the bars 46 by the prime movers 54. As the pins 44 move outward from the reels 26, 28, they engage the medium 32. The brake 29 and drag or torquing member 27 are energized, which facilitates withdrawing the medium 32 from the reel 26 under tension. The pins are moved outward under the control of the control unit 36, until the medium 32 is formed into an expanded loop as shown in phantom view in FIG. 2. The expanded loop of the medium 32, approximates the shape of the operating path of the transport means, which are disposed below the loop.

Figure 3:
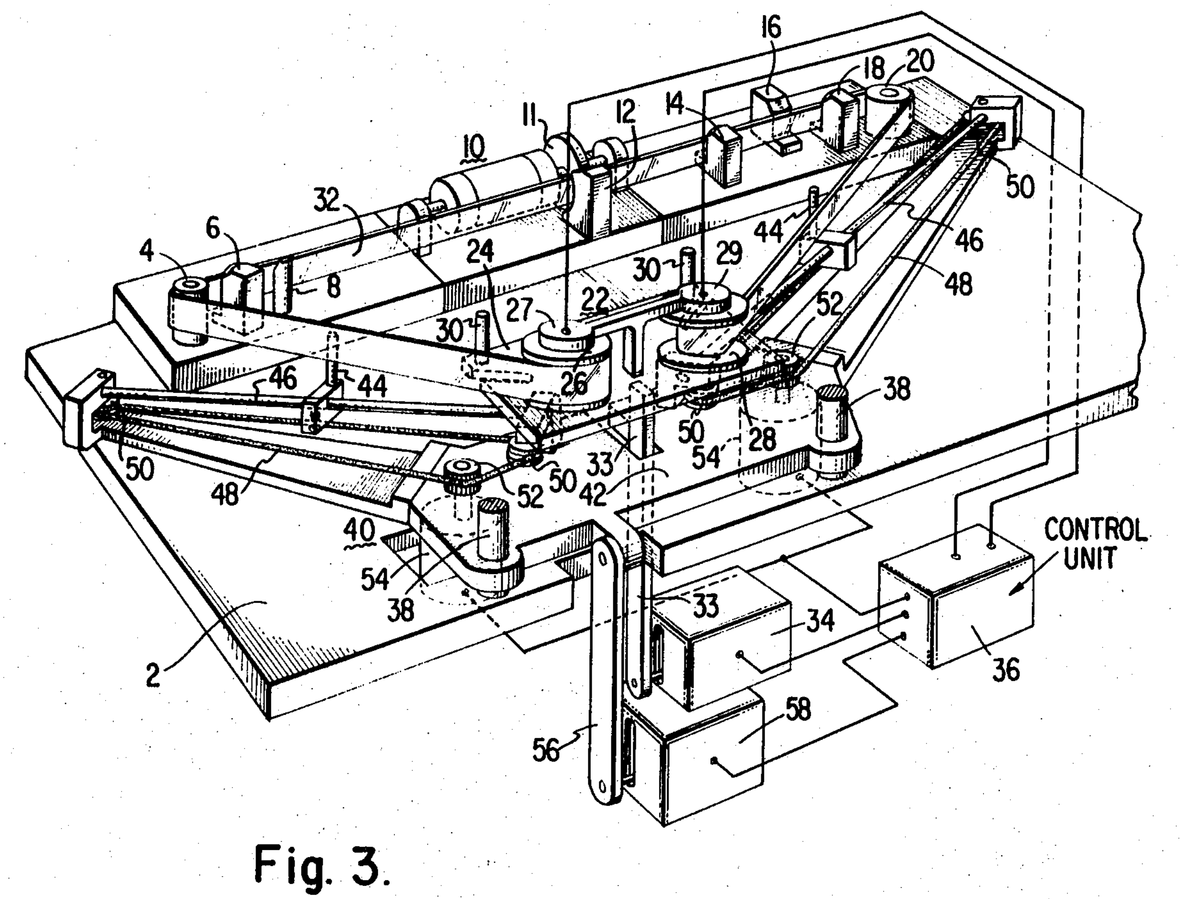
FIG. 3 is a perspective view of the embodiment of FIG. 1, wherein the further positioning of the elements thereof is shown.

Reference is now made to FIG. 3, in which like reference numerals correspond to the elements shown and described in FIG. 1. In FIG. 3, the assembly 40 is moved to its lower position by the prime mover 58. Simultaneously, the assembly 22 is also moved to its lowered position by the prime mover 34. As the assemblies 22 and 40 assume their lowered position, the record medium 32 is disposed about and interleaved with the transport means of the base member 2. As shown in FIG. 3, the pins 44 are then returned along the bar 46 to a position adjacent to the web storage assembly 22. As the pins 44 return, the tension of the medium 32 which is provided by the members 27 and 29, causes the medium 32 to be drawn against the working surfaces of the transport means which define the desired operating path for the medium 32.

To more easily accomplish the positioning of the medium 32 into the transport path as assemblies 22 and 40 are lowered, certain of the transport elements preferably have top portions with a given shape contour. As shown in FIGS. 1, 2 and 3 the elements 6, 8, 12, 14, 16 and 18 are made to have a tapered or sloping section at their ends which project from the base 2. The taper or slope of each element is oriented to direct the medium 32, as it is lowered, into the desired position adjacent to the working surface of the transport elements. While in the present embodiment a straight line taper is shown, it will be understood that other suitable shapes may be utilized.

One the medium 32 is in the transport path as shown in FIG. 3, the reels 26, 28 along with the capstan 20 can be driven by suitable means, not shown, in a conventional manner to provide record or playback operation. Thus, suitable driving means can be associated with the reels 26, 28 shown in FIG. 1, and operated from the control unit 36 to impart the desired rotational movement to the reels 26, 28. The operation of the transport path can be substantially the same as found in a typical recorder-reproducer system.

To remove the record medium 32 from the operating path of the transport, and return it to the web storage assembly 22, the control unit 36 causes the sequence of events shown and described in FIGS. 1, 2 and 3 to be performed in reverse order.

The pins 44 are made to form the medium 32 into the expanded loop as shown in phantom in FIG. 2. The assemblies 40 and 22 are raised, clearing the medium 32 from the transport path. The pins 44 return the medium 32 to the reels 26, 28, and the assembly 40 is thereafter lowered to an out of the way position shown in FIG. 1. The assembly 22 can be in the form of a cartridge which can readily be removed for storage elsewhere. A different cartridge or assembly 22 can then be placed in the manner of that shown in the drawing with the operation being as described. Further, an automatic storage and sequencing apparatus can be provided which operates with the control unit 36 to make a desired sequence of assemblies 22 automatically available one at a time for operation on the transport path.

The makeup and orientation of the transport means shown in FIG. 1, 2 and 3 will be recognized in the art, as representing the transport arrangement of a transverse or quadruplex type recorder-reproducer system. However it is to be understood, that the present invention is applicable to other type recorder-reproducer transports, such as longitudinal and helical systems. It is also to be understood that the implementation of the embodiment shown in the FIGS. is illustrative, and that other suitable known means may be employed in the practice of the invention. For example, the web engaging elements 44 may be mounted on one end of a rod. The other end of the rod is pinned to the base member 2 so the rod is free to rotate over the surface of the base member 2. For this arrangement the elements 44 form the medium 32 into an expanded loop, by traversing an arcuate path rather than the straight line path of the bar 46 as shown.

What is claimed is:

1. In a recorder-reproducer system including a base member with a surface on which is mounted transport means for providing guided movement of a flexible recording web past a signal transducer to define an operating path for said web, said transport means being disposed on one side of a given plane, with said system further including means coupled to said base member adapted for holding a storage means which includes said flexible recording web, a device for automatically disposing said recording web for operation along said operating path comprising: web engaging means arranged to engage said web in said storage means, means coupled to said web engaging means for movement of said engaging means to withdraw a portion of said web from said storage means and to form said withdrawn portion into a shape on a second side of said given plane which approximates the shape of said operating path, and means for relatively moving said shape web toward said base surface to place said transport means and said web in cooperating relation on the same side of said given plane.

2. In a recorder-reproducer system, a device for automatically disposing a recording web for operating along a given operating path, comprising:

a base member having a surface with a plurality of web transport means secured to said base surface in spaced relation to define said given operating path;

first means mounted on said base member adapted for holding a storage means which includes a recording web;

web engaging means mounted on said base member for movement between a first position in which said web engaging means is adjacent said first means and a second position in which said web engaging means is adjacent the limits of said given operating path;

means for moving said web engaging means and said first means relative to each other to a position where said web engaging means, when in said first position is disposed to engage said web when present on said first mean;

means for moving said web engaging means to said second position so that a web when present on said first means is extended to be adjacent said operating path; and means for relatively moving at least one of said web engaging means and said first means and said first means with respect to said web transport means to bring a web when present in said extended condition toward said base surface into cooperating relationship with said transport means.

3. In a system as claimed in claim 2, and further including means for opposing pay out of a web from said web storage means, thereby maintaining tension on said web as it is extended.

4. In a system claimed in claim 2, and wherein said web is a magnetic tape, said transport means including a quadruplex magnetic headwheel assembly including a headwheel and a guide shoe, said last-mentioned moving means operating to insert said tape toward said base member between said headwheel and said shoe, and a control unit operatively coupled to said moving means for the operation thereof in a controlled sequence.

5. In a recorder-reproducer system, a device for automatically disposing a recording web for operating along a given operating path, comprising:

a base member having a surface with a plurality of web transport means secured to said base surface in spaced relation to define said given operating path;

a frame member mounted on said base member, said frame member having a pair of reels rotatably mounted thereon, with said recording web wound between said reels;

at least two pins adapted to engage said web, said pins being mounted on said base member for movement between a first position in which said pins are close together and adjacent said web and a second position in which said pins are located adjacent the limits of said given operating path;

means for moving said pins and said frame member relative to each other to a position where said pins, when in their first position are between said web and said reels;

means for moving said pins to the second position thereof whereby said web is extended to be adjacent said operating path; and means for relatively moving at least one of said frame member and toward said base surface to bring said web when in said extended condition into cooperating relationship with said transport means.

6. In a system as claimed in claim 5, wherein; at least some of said web transport means include a portion shaped for directing said web toward said base surface to a working surface of said transport means which is adapted to cooperate with said recording web.

7. In a system as claimed in claim 5, and further including;

means coupled to said pair of reels for opposing payout of said web from one of said reels and for preventing pay of said web from the other of said reels.

8. In a system as claimed in claim 5, and wherein said web is a magnetic tape and said web transport means includes a quadruplex magnetic headwheel assembly including a magnetic headwheel and a guide shoe, said last-mentioned moving means operating to move said tape toward said base member and between said headwheel and said guide shoe.

9. In a system as claimed in claim 5, and wherein said moving means are all operated from a common control sequence.

* * * * *

UNITED STATES PATENT OFFICE
CERTIFICATE OF CORRECTION

Patent No. 3,654,400 Dated April 4, 1972

Inventor(s) Bernard L. Dickens, Leonard J. Kudla, Arch C. Luther, Jr., and Bruno F. Melchionni It is certified that error appears in the above-identified patent and that said Letters Patent are hereby corrected as shown below:

Column 3, Line 30 - "One" should be --Once--

Column 4, line 51 - Word left out, insert after "system" --as--

Column 6, line 12 - Words left out, insert after "control" --unit in controlled--

Signed and sealed this 1st day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334